(12) United States Patent
Ise

(10) Patent No.: US 10,773,681 B2
(45) Date of Patent: *Sep. 15, 2020

(54) BASE FABRIC FOR AIRBAG AND AIRBAG

(71) Applicant: ASAHI KASEI KABUSHIKI KAISHA, Tokyo (JP)

(72) Inventor: Fumiaki Ise, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,296

(22) Filed: Apr. 11, 2019

(65) Prior Publication Data

US 2019/0232913 A1    Aug. 1, 2019

Related U.S. Application Data

(63) Continuation of application No. 15/313,796, filed as application No. PCT/JP2014/064126 on May 28, 2014, now Pat. No. 10,308,209.

(51) Int. Cl.
*B60R 21/235*     (2006.01)
*D03D 1/02*       (2006.01)
(Continued)

(52) U.S. Cl.
CPC ............ *B60R 21/235* (2013.01); *D03D 1/02* (2013.01); *D06M 13/252* (2013.01);
(Continued)

(58) Field of Classification Search
CPC ............ B60R 2021/23509; B60R 2021/23542; B60R 21/235; D03D 1/02; D06M 13/252;
(Continued)

(56) References Cited

U.S. PATENT DOCUMENTS 10,308,209 B2 *   6/2019   Ise .................. B60R 21/235
2002/0155774 A1  10/2002  Kitamura et al.
(Continued)

FOREIGN PATENT DOCUMENTS

JP    2004-362442 A    12/1992
JP    2006-228879 A     8/1994
(Continued)

OTHER PUBLICATIONS

International Search Report from Japanese Patent Office for PCT/JP2014/064126 dated Sep. 2, 2014, pp. 1-2.
(Continued)

*Primary Examiner* — Arti Singh-Pandey
(74) *Attorney, Agent, or Firm* — Finnegan, Henderson, Farabow, Garrett & Dunner, L.L.P.

(57) ABSTRACT

The purpose of the present invention is to provide a base fabric for an airbag and an airbag wherein the strength of sewn parts is high, pressure resistance is superior for an airbag during high-pressure deployment at high speeds, and pressure resistance can be maintained even after passage of time in heat. This base fabric for an airbag is characterized by being formed from woven polyamide fibers, and the retention of sewn part strength in the base fabric with heating before and after heat treatment for 400 hours at 140° C. being 70% or greater.

15 Claims, 1 Drawing Sheet

(51) Int. Cl.
  *D06M 13/252* (2006.01)
  *D06M 101/34* (2006.01)
(52) U.S. Cl.
  CPC ............ *B60R 2021/23509* (2013.01); *B60R 2021/23542* (2013.01); *D06M 2101/34* (2013.01); *D10B 2331/02* (2013.01); *D10B 2505/124* (2013.01)
(58) Field of Classification Search
  CPC .......... D06M 2101/34; D10B 2331/02; D10B 2505/124
  See application file for complete search history.

(56) References Cited

U.S. PATENT DOCUMENTS

| | | |
|---|---|---|
| 2012/0225229 A1 | 9/2012 | Ise |
| 2013/0147170 A1 | 6/2013 | Tanaka et al. |
| 2015/0079864 A1 | 3/2015 | Nishimura et al. |

FOREIGN PATENT DOCUMENTS

| | | |
|---|---|---|
| JP | 2007-237516 A | 9/1995 |
| JP | H09-188968 A | 7/1997 |
| JP | 2010-060750 A | 3/1998 |
| JP | 2010-168700 A | 6/1998 |
| JP | 2000 303303 A | 10/2000 |
| JP | 3 293216 B2 | 6/2002 |
| JP | 2002-317343 A | 10/2002 |
| JP | 2003-055861 | 2/2003 |
| JP | 2006-248521 A | 9/2006 |
| JP | 2008-225048 A | 9/2006 |
| JP | 2007-284826 A | 11/2007 |
| JP | 2009-275294 A | 11/2009 |
| JP | 2011-168919 | 9/2011 |
| JP | 2011-168938 | 9/2011 |
| JP | 2012-052280 A | 3/2012 |
| WO | WO 2011/055562 A1 | 5/2011 |
| WO | WO 2012/026455 A1 | 3/2012 |
| WO | WO 2013/168730 A1 | 11/2013 |

OTHER PUBLICATIONS

International Preliminary Report on Patentability for PCT/JP2014/064126 dated Nov. 29, 2016, pp. 1-7.
Translation of Written Opinion of the International Searching Authority for PCT/JP2014/064126 dated Sep. 2, 2014, pp. 1-6.
Supplementary European Search Report for EP Patent Application No. 14893329.4 dated May 22, 2017. (4 pages).

* cited by examiner

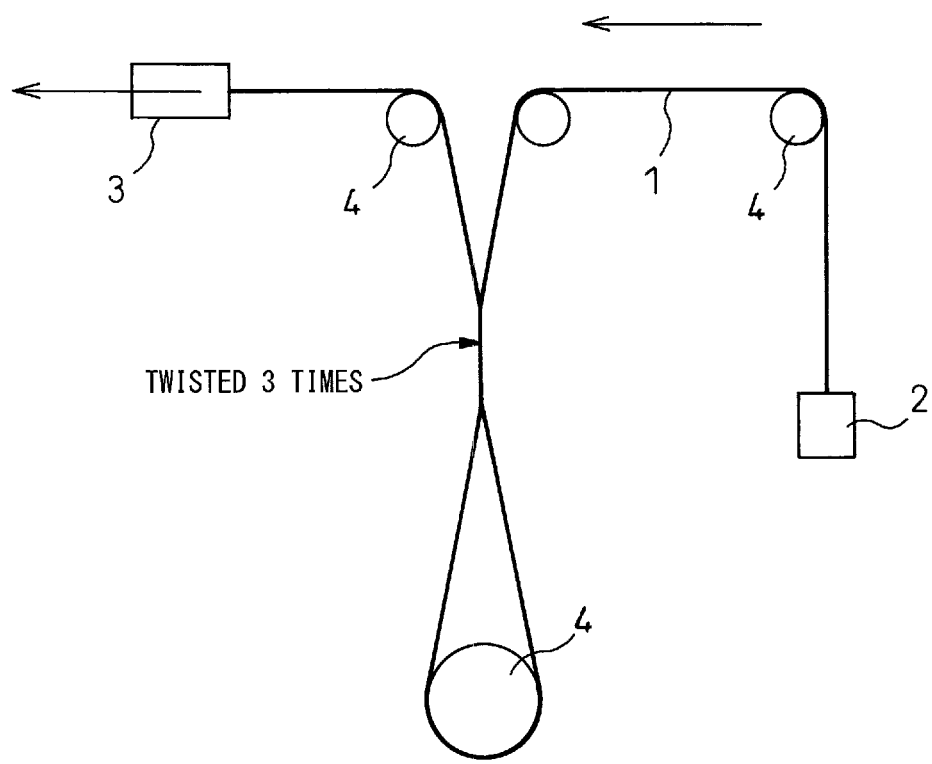

BASE FABRIC FOR AIRBAG AND AIRBAG

CROSS-REFERENCE TO RELATED PATENT APPLICATIONS

This application is a continuation of allowed U.S. patent application Ser. No. 15/313,796, filed Nov. 23, 2016, which is the national stage filing under 35 U.S.C. § 371 of International Application No. PCT/JP2014/064126, filed May 28, 2014. The entire contents of the above-referenced applications are expressly incorporated herein by reference.

TECHNICAL FIELD

The present invention relates to an airbag used as the bag body of an airbag device functioning as a device that protects passengers in a vehicle during a collision, and more particularly, to a base fabric for an airbag that allows the obtaining of an airbag that has high pressure resistance when deployed at high speeds, and an airbag using that base fabric.

BACKGROUND ART

Airbags have continued to be installed in motor vehicles for the purpose of reducing the impact on the human body during a collision accident involving a vehicle such as an automobile. At the time of impact, the airbag is inflated by a gas to deploy in the form of a bag that absorbs and reduces impact on the body, and in addition to airbags for the driver's seat and front passenger seat, various types of airbags such as curtain airbags, side airbags, knee airbags or rear airbags are also being applied practically to protect occupants. Moreover, airbags have also been proposed for use as airbags installed so as to inflate outside of a vehicle in order to protect pedestrians.

Airbags such as curtain airbags, which deploy and inflate from the ceiling of the vehicle above the doors to protect the head during a side collision, or side impact airbags, which deploy and inflate from the passenger seats in order to protect the chest and lower back regions, are required to deploy rapidly and protect the body due to the short distance between the sidewall of the vehicle and the body.

When not in use, these airbags are stored by being folded into a compact form. When a collision is detected by a sensor and the airbag is deployed and inflated, the airbag flies out into the cabin by breaking through the fittings of ceiling trim covers or sewn parts of passenger seats while being unfolded by gas generated by an inflator, thereby enabling the airbag to absorb impacts and protect the body when fully inflated.

It is necessary to enhance pressure resistance of the bag body in order to make airbags requiring rapid deployment to demonstrate a higher degree of safety. In order to accomplish this, it is necessary not only to enhance the strength of the airbag base fabric but also the sewn parts where breaking strength is weak.

Various proposals have previously been made for modifying and improving the properties of the sewn parts of airbags.

For example, in Patent Document 1 indicated below, lock stitching is carried out using sewing thread having high rupture elongation, and seam slippage observed after deployment are inhibited to the degree of chain stitching despite being lock stitched. However, sewing thread having high elongation is disadvantageous for rapid deployment while preventing gas leakage and without causing a decrease in gas utilization efficiency during high pressure deployment. In addition, technology has yet to be disclosed regarding the properties of airbag base fabric as related to the strength of sewn parts.

In addition, in Patent Document 2 indicated below, sewing thread composed of aramid fibers is used to sew around the mouth for mounting an inflator. Although the use of heat-resistant, ultra-high-strength thread for the sewing thread in the vicinity of an inflator is useful, technology has yet to be disclosed regarding the properties of airbag base fabric as related to the strength of sewn parts.

Patent Document 3 indicated below indicates that the gas injection pressure resistance of an airbag is enhanced by increasing the pullout resistance of the composite yarns of the base fabric. Consequently, Patent Document 3 discloses sewing a high-density woven fabric having a cover factor of 1700 or more and air permeability of 1.5 $cc/cm^2/sec$ or less using sewing thread having a specific fineness under specific sewing conditions. Although the woven fabric has high density, is resistant to the formation of openings therein, has high pullout resistance and high airbag pressure resistance, it was inadequate in terms of enhancing stitch strength and high-pressure deployment at high speeds.

Patent Document 4 indicated below discloses sewing thread having tensile strength of 9 cN/dtex or more as well as high loop strength. Although gas infusion pressure resistance of an airbag is enhanced by enhancing the properties of the sewing thread, technology is not disclosed regarding properties of the airbag base fabric as related to the strength of sewn parts.

Moreover, technology has yet to be disclosed relating to an airbag that demonstrates high stitch strength even after having been exposed to a high-temperature environment, demonstrates high pressure resistance during high-pressure deployment at high speeds, and demonstrates a higher degree of safety.

PRIOR ART DOCUMENTS

Patent Documents

Patent Document 1: Japanese Unexamined Patent Publication (Kokai) No. H7-237516
Patent Document 2: Japanese Unexamined Patent Publication (Kokai) No. H8-225048
Patent Document 3: Japanese Unexamined Patent Publication (Kokai) No. 2006-248521
Patent Document 4: Japanese Unexamined Patent Publication (Kokai) No. 2009-275294

SUMMARY OF THE INVENTION

Problems to be Solved by the Invention

An object of the present invention is to provide a base fabric for an airbag, which demonstrates high strength of the sewn parts thereof, superior pressure resistance for use as an airbag during high-pressure deployment at high speeds, and in particular, is able to maintain pressure resistance even after the passage of time in the presence of heat, and an airbag that uses that base fabric.

Means for Solving the Problems

The inventor of the present invention found that, by controlling friction and polymer crystallization on a fiber surface and controlling the shape of fibers in an airbag base fabric, the strength of sewn parts is enhanced and the strength of sewn parts can be maintained even after the passage of time in the presence of heat, thereby leading to completion of the present invention on the basis of those findings.

Namely, the present invention provides the inventions indicated below.

(1) A base fabric for an airbag composed of woven polyamide yarns, wherein the retention rate of the strength of sewn parts of the base fabric before and after heat treatment for 400 hours at 140° C. is 70% or more.

(2) The base fabric for an airbag described in (1) above, wherein the ratio of the sewn part strength to non-sewn part strength of the base fabric (sewn part strength/non-sewn part strength) is 60% or more.

(3) The base fabric for an airbag described in (1) or (2) above, wherein the difference in crimp of yarns between the warp direction and weft direction of composite yarns composing the base fabric after heat treatment for 400 hours at 140° C. is 8.5% or less.

(4) The base fabric for an airbag described in any of (1) to (3) above, wherein the loop strength of composite yarns following heat treatment for 400 hours at 140° C. is 4.5 cN/dtex or more.

(5) The base fabric for an airbag described in any of (1) to (4) above, wherein the yarn-to-yarn friction index of composite yarns following heat treatment for 400 hours at 140° C. is 1.5 to 3.5.

(6) The base fabric for an airbag described in any of (1) to (5) above, wherein the loop strength of composite yarns composing the base fabric is 4.5 cN/dtex to 10.0 cN/dtex.

(7) The base fabric for an airbag described in any of (1) to (6) above, wherein the yarn-to-yarn coefficient of friction of composite yarns is 1.5 to 3.5 and the loop strength is 7 cN/dtex or more.

(8) The base fabric for an airbag described in any of (1) to (7) above, wherein the tensile strength of the base fabric following heat treatment for 400 hours at 140° C. is 500 N/cm or more.

(9) The base fabric for an airbag described in any of (1) to (8) above, wherein the tensile strength is 500 N/cm or more.

(10) The base fabric for an airbag described in any of (1) to (9) above, wherein the strength of the raw yarn used for the weaving yarn is 8.0 cN/dtex or more.

(11) The base fabric for an airbag described in any of (1) to (10) above, wherein at least one type of oily component selected from the group consisting of a higher alcohol ester and/or a higher alcohol polyether ester of a carboxylic acid having a thioether group, a nonionic surfactant component and a modified silicone component is fed to polyamide yarns followed by weaving into a woven fabric.

(12) The base fabric for an airbag described in (11) above, wherein the amount of cyclohexane-extracted oily components is greater than 0.02% by weight but less than 0.3% by weight based on the weight of the base fabric.

(13) The base fabric for an airbag described in (12) above, wherein a higher alcohol ester and/or a higher alcohol polyether ester of a carboxylic acid having a thioether group is contained in the cyclohexane-extracted oily components at 0.01% by weight or more based on the weight of the base fabric.

(14) The base fabric for an airbag described in (12) or (13) above, wherein a higher alcohol ester of a carboxylic acid having a thioether group is contained in the cyclohexane-extracted oily components at 0.015% by weight or more based on the weight of the base fabric.

(15) The base fabric for an airbag described in any of (12) to (14) above, wherein components for which the organic/inorganic ratio is 1.50 to 1.70 are contained in total in the cyclohexane-extracted oily components at 10% by weight or more of the total amount of oily components.

(16) The base fabric for an airbag described in any of (12) to (15) above, wherein a nonionic surfactant component is contained in the cyclohexane-extracted oily components at 0.01% by weight or more based on the weight of the base fabric.

(17) An airbag obtained by sewing the base fabric for an airbag described in any of (1) to (16) above.

(18) An airbag module that uses the airbag described in (17) above.

Effects of the Invention

The base fabric for an airbag of the present invention demonstrates high strength of the sewn parts thereof, demonstrates superior pressure resistance for use as an airbag during high-pressure deployment at high speeds, is able to maintain pressure resistance even after the passage of time in the presence of heat, and is suitable for use in an airbag device that is deployed at a site in close proximity to the body. In particular, it is suitable for use in an airbag module such as a side curtain airbag or side impact airbag for deployment during a side collision.

BRIEF DESCRIPTION OF THE DRAWINGS

FIG. 1 is a drawing for explaining a method used to measure twisting friction index in the present invention.

EMBODIMENTS FOR CARRYING OUT THE INVENTION

The following provides a detailed explanation of the invention of the present application.

In the base fabric for an airbag of the present invention, examples of polyamide yarns (fibers) that compose the base fabric include yarns composed of polyamide 6, polyamide 6/6, polyamide 11, polyamide 12, polyamide 6/10, polyamide 6/12, polyamide 4/6, copolymers thereof and mixtures thereof. Polyamide 6/6 yarns are particularly preferably yarns mainly composed of polyhexamethylene adipamide resin. Although polyhexamethylene adipamide resin refers to polyamide resin having a melting point of 250° C. or higher and composed of 100% hexamethylene diamine and adipic acid, the yarns composed of polyamide 6/6 resin used in the present invention may be composed of resin obtained by copolymerizing or blending a resin such as polyamide 6, polyamide 6/I, polyamide 6/10 or polyamide 6/T with polyhexamethylene adipamide within a range such that the melting point thereof is not lower than 250° C. Furthermore, various additives normally used for the purpose of improving productivity or physical properties in the raw thread production step or processing steps may be contained in these fibers. Examples of additives that can be contained include heat stabilizers, antioxidants, photostabilizers, lubricants, antistatic agents, plasticizers and flame retardants.

The base fabric for an airbag of the present invention preferably retains strength of sewn parts after sewing the base fabric and exposing to a temperature of 140° C. for 400 hours of 70% or more and more preferably 80% or more. If the retention rate of the strength of sewn parts after the passage of time in the presence of heat is high at 70% or more, the airbag demonstrates high reliability in high-temperature environments.

In the present invention, evaluation of the retention rate of the strength of sewn parts after the passage of time in the presence of heat was carried out using the sewing method indicated below. Two base fabric samples were sewn by aligning the warp and weft directions. Sewing thread composed of Nylon 66 filament yarns and having a fineness of 1300 dtex to 1450 dtex and strength of 900 N or more was used for the sewing thread. The sewing thread preferably contains 30 ppm to 120 ppm of copper as elemental copper and 3 equivalents to 25 equivalents of halogen relative to the copper, the number of twists is 150 t/m to 350 t/m, and it is impregnated with resin. In addition, the impregnated resin of the sewing thread is preferably contained at 0.8% by weight to 30% by weight. Sewing consists of lock stitching at 45 stitches/10 cm. Heat treatment conditions consist of exposing to heat by allowing to stand in a heating oven for 400 hours at 140° C. Measurement of the strength of sewn parts was carried out by performing a tensile test by clamping one side of each of the two woven fabrics centering on the stitches and then determining breaking strength of the sewn parts. The strength retention rate after the passage of time in the presence of heat was determined by determining the retention rate (%) from a comparison of breaking strength of sewn parts before and after heat treatment and then using the average retention rate (%) of the warp and weft directions.

In the base fabric for an airbag of the present invention, the sewing utilization rate thereof is preferably 60% or more, more preferably 70% or more and even more preferably 80% or more. In the present invention, sewing utilization rate refers to the ratio of the tensile breaking strength of sewn parts of the base fabric to the tensile breaking strength of non-sewn parts (sewn parts/non-sewn parts), and the lower of the sewing utilization rates in the warp and weft directions is used for the sewing utilization rate (%). Pressure resistance of the airbag when the airbag absorbs collision energy is primarily attributable to high tensile breaking strength of the sewn parts, and as a result of having a high sewing utilization rate, an airbag can be formed that takes adequate advantage of the basic mechanical property of the airbag base fabric in the form of tensile strength. Moreover, it is also an important element for enhancing tensile breaking strength of sewn parts after the passage of time in the presence of heat.

The crimp of both warp and weft composite yarns of the base fabric for an airbag of the present invention are preferably 0.5% to 12.0% and more preferably 10.0% or less following heat treatment for 400 hours at 140° C. As a result of the crimp of the composite yarns being 12.0% or less following heat treatment, formation of openings in sewn parts resulting in excessive leakage of gas used to deploy the airbag and causing a delay in deployment and inflation, or the passage of hot gas concentrating only at certain locations resulting in rupturing of the bag, can be avoided. Although sewing thread and yarns composing the fabric intertwine and pull on each other due to tensile stress, reducing the yarn crimp of the fabric makes it possible to inhibit the formation of openings in sewn parts. The crimp of composite yarns in high-density fabrics for use in airbags requiring high strength is 0.5% or more. Although the crimp of the composite yarns changes since polyamide fibers shrink as a result of being subjected to heat treatment, by making the crimp to be on the low side even after heat treatment for 400 hours at 140° C., the environment-compatible pressure resistance of the airbag can be satisfied. In order to make the crimps of both warp and weft composite yarns to be 0.5% to 12.0%, in addition to being a high-density fabric having a cover factor of 2000 or more, there should be no large differences in crimp structure when compared in the warp and weft directions. In addition, crimp can also be inhibited by suitably selecting warp and weft tension conditions during control from the sewing step to the shrink processing step.

The difference in crimps of the composite yarns in the warp and weft directions in the base fabric for an airbag of the present invention after heat treatment for 400 hours at 140° C. is preferably 8.5% or less, more preferably 8.0% or less and even more preferably 6.0% or less. As a result of making the difference in crimps of the composite yarns to be 8.5% or less, pressure resistance of the airbag can be enhanced without allowing stress to concentrate excessively in either one of the warp and weft directions of the woven fabric around the needle holes of sewn parts. Although sewn parts are simultaneously pulled in the warp and weft directions at equal stress when the airbag is subjected to high pressure, at that instant, stress concentrates in the direction in which the sewing thread has the least degree of freedom, namely the direction in which the crimp is lowest. Thus, in the case of a large difference in crimps between the warp and weft directions, pressure resistance of the airbag decreases during high-speed deployment irrespective of the fabric tensile breaking strength of the base fabric. The difference in crimps in the warp and weft directions is preferably as small as possible, and there is most preferably no difference in crimps between the warp and weft directions. If the difference in crimps in the warp and weft directions in the base fabric is small following heat treatment, coupled with a low yarn-to-yarn friction coefficient following heat treatment, this contributes to increasing the strength retention rate of sewn parts following the passage of time in the presence of heat. Since high-density fabric tends to be woven by incorporating large crimps in the warp direction in the weaving step, a large difference in crimps occurs between the warp and weft directions. However, this difference in crimps can be reduced in subsequent fabric processing steps. For example, by applying a state of tension for the fabric transport conditions in the warp direction in the heat setting step following scouring and drying, and applying widening conditions on the shrinkage side for fabric width conditions in the weft direction, the difference in crimps of composite yarns in the warp and weft directions can be made to be 8.5% or less. In addition, a difference in crimps in the warp and weft directions can also be reduced by providing a difference in weaving densities in the warp and weft directions of the woven fabric. For example, if a high weaving density is employed in the warp direction and a low weaving density is employed in the weft direction, the difference in crimps in the warp and weft directions becomes smaller.

The ratio of weaving density in the warp direction to that in the weft direction (warp direction/weft direction) is preferably 1.00 to 1.20 and more preferably 1.00 to 1.09. The difference in crimps in the warp and weft directions becomes smaller as the weaving density ratio becomes larger. If the weaving density ratio is 1.00 or more, differences in crimps in the warp and weft directions are inhibited, which is also economically advantageous since there is no increase in the number of picks of the weaving thread in the weft direction. If the weaving density ratio is 1.20 or less, there is little difference in tensile strength between the warp and weft directions. Moreover, if the weaving density ratio is 1.09 or less, the possibility of a decrease in sewing utilization rate caused by differences in physical properties in the warp and weft directions is eliminated.

In the composite yarns of the base fabric for an airbag of the present invention, loop strength following heat treatment for 400 hours at 140° C. is preferably 4.5 cN/dtex or more, more preferably 7 cN/dtex or more and particularly preferably 8 cN/dtex or more. If loop strength is 4.5 cN/dtex or more, this level of loop strength contributes to improving the strength of sewn parts thereby making it possible to enhance pressure resistance of the airbag. Loop strength of the composite yarns is the fundamental breaking resistance of sewn parts when sewing thread and fabric composite yarns are intertwined and caused to pull on each other by tensile stress. On the surface of the composite yarns, polyamide polymer tends to undergo crystal growth and local embrittlement due to heat treatment, polymer chains may be cleavaged due to oxidative degradation, or the formation of microcracks may cause a decrease in loop strength. However, if loop strength is maintained by being able to withstand heat treatment for 400 hours at 140° C., the strength of sewn parts can be maintained and heat-resistant pressure resistance of the airbag can be satisfied. The loop strength of composite yarns is twice the value of tensile strength or less or 20 cN/dtex or less. In order to make loop strength following heat treatment to be 4.5 cN/dtex or more, a component having an antioxidant function or a component that easily permeates into amorphous portions of the polymer may be imparted as an oily component to the surface of the polyamide yarns of the base fabric.

In addition, in the composite yarns of the base fabric for an airbag of the present invention, the yarn-to-yarn friction coefficient following heat treatment of the base fabric for 400 hours at 140° C. is preferably 1.5 to 3.5 and more preferably 1.8 to 3.0. If the yarn-to-yarn friction coefficient has a low value of 3.5 or less, it contributes to improvement of the strength of sewn parts, thereby making it possible to enhance pressure resistance of the airbag. Although sewing thread and fabric composite yarns of sewn parts are intertwined and pull on each other when the airbag is exposed to high pressure, if the friction coefficient is low, composite threads in the woven fabric slide and gather together, thereby making it possible to withstand break of the woven fabric by avoiding concentration of stress. As a result of making the surface to have a low friction coefficient capable of withstanding heat treatment for 400 hours at 140° C., the strength of sewn parts can be maintained and heat-resistant pressure resistance of the airbag can be satisfied. The retention rate of the strength of sewn parts can be enhanced as a result of having a low yarn-to-yarn friction coefficient following heat treatment. Since there are limitations on the degree to which the friction coefficient of polyamide yarns can be lowered, the yarn-to-yarn friction coefficient is 1.5 or more. In order to achieve a yarn-to-yarn friction coefficient of 1.5 to 3.5 following heat treatment, as little as possible of the oily components on the surface of the composite yarns should be allowed to remain so as to prevent it from being lost due to volatilization and diffusion caused by heat treatment, and a component should be selected and imparted so as to maintain the smoothing action function thereof even after heat treatment in order to prevent degeneration of the oily components due to heat treatment.

In the composite yarns of the base fabric for an airbag of the present invention, loop strength is preferably 4.5 cN/dtex or more, more preferably 7 cN/dtex or more, particularly preferably 8 cN/dtex or more, and even more preferably 9 cN/dtex or more. Loop strength of 4.5 cN/dtex or more contributes to improvement of the strength of sewn parts, thereby making it possible to enhance pressure resistance of the airbag. Loop strength of the composite yarns is the fundamental breaking resistance of sewn parts when sewing thread and fabric composite yarns are intertwined and caused to pull on each other by tensile stress. It is the fundamental property for enhancing sewing utilization rate of the base fabric that enables sewn parts to withstand tensile testing. In order to increase loop strength, polyamide fibers are selected for which strain between suitably drawn internal and external structure-disorder has been reduced, and a suitable oily component is fed that promotes smoothness of the surfaces of the polyamide yarns composing the base fabric. In addition, loop strength is preferably 15.0 cN/dtex or less from the viewpoint of obtaining balance with the high tensile strength of the composite threads.

In the composite yarns of the base fabric for an airbag of the present invention, the yarn-to-yarn friction coefficient is preferably 1.5 to 3.5. If the yarn-to-yarn friction coefficient is 3.5 or less, it contributes to increasing sewing utilization rate. If the yarn-to-yarn friction coefficient is 1.5 or more, there are no increases in the leakage of deployment gas due to the presence of excessively large openings in the weaving yarn of the base fabric.

The tensile strength of the base fabric for an airbag of the present invention is preferably 500 N/cm or more. If the tensile strength is 500 N/cm or more, strength of sewn parts is enhanced and the strength of sewn parts after the passage of time in the presence of heat can also be enhanced, thereby resulting in an airbag that demonstrates a high level of reliability.

In addition, the tensile strength of the base fabric for an airbag of the present invention following heat treatment for 400 hours at 140° C. is also preferably 500 N/cm or more and more preferably 600 N/cm or more. If tensile strength after the passage of time in the presence of heat is high at 500 N/cm or more, the strength of sewn parts after the passage of time in the presence of heat is also high, thereby resulting in an airbag that demonstrates a high level of reliability.

The amount of oily component extracted with cyclohexane in the base fabric for an airbag of the present invention is preferably greater than 0.02% by weight to less than 0.3% by weight, more preferably 0.03% by weight to 0.2% by weight and even more preferably 0.05% by weight to 0.15% by weight based on the weight of the base fabric. If the cyclohexane-extracted oily component exceeds 0.02% by weight, friction on the surface of the polyamide fibers is reduced and decreases in physical properties of the fibers can be prevented by preventing the formation of large crystals near the surface of the polyamide yarns. Thus, this amount of cyclohexane-extracted oily component is able to contribute to improvement of the strength of sewn parts and enhance pressure resistance of the airbag. On the other hand, by making the amount of cyclohexane-extracted oily component to be less than 0.3% by weight, unraveling of composite threads can be prevented, and the formation of openings in sewn parts resulting in excessive leakage of deployment gas from the airbag or rupture of the bag caused by the passage of hot gas concentrating only at certain locations can be avoided. Although spinning oil or weaving oil can be removed in the water jet loom step in which the woven fabric is produced, conditions in the scouring step can be suitably selected following weaving, or the woven fabric can be finished by imparting an oily component thereto, in order to make the amount of extracted oily component to be greater than 0.02% by weight but less than 0.3% by weight, the composition of the spinning oily agent is preferably selected so that an effective oily component composition is adsorbed and permeates into the surface of the weaving thread fibers after going through these steps.

The cyclohexane-extracted oily component of the base fabric for an airbag of the present invention preferably contains a higher alcohol ester and/or a higher alcohol polyether ester of a carboxylic acid having a thioether group (Component A), and the adhered amount of Component A is preferably 0.01% by weight or more, more preferably 0.015% by weight or more, and even more preferably 0.02% by weight or more based on the weight of the base fabric. The higher alcohol ester of a carboxylic acid contributes to improvement of sewing utilization rate by allowing the fibers to slide. Moreover, the antioxidant action of the thioether group prevents thermal degradation of the higher alcohol ester per se as well as other oily components, thereby contributing to improvement of the strength retention rate of sewn parts by maintaining sliding action after the passage of time in the presence of heat and inhibiting rough hardening of the surface of the polyamide yarns.

Thus, as a result of Component A having the effect of lowering friction by demonstrating a smoothing action on the surface of the polyamide yarns, contributing to improvement of sewing utilization rate and inhibiting thread-on-thread friction index to a low level following heat treatment, it contributes to improvement of the retention rate of the strength of sewn parts after the passage of time in the presence of heat. The amount of Component A in the extracted oily component is preferably high at 0.01% by weight to 0.2% by weight and more preferably 0.02% by weight to 0.2% by weight based on the weight of the base fabric. An amount of Component A of 0.01% by weight or more can be expected to have the effect of preventing oxidation. Since there are cases in which antistatic properties may be inferior with exclusive Component A, the amount thereof is preferably 0.2% by weight or less.

A thioether monocarboxylic acid represented by the following formula (1) and a thioether dicarboxylic acid represented by the following formula (2) are preferable for the carboxylic acid present in the thioether group of Component A.

$$R^5—S—R^6COOH \quad (1)$$

$$S(R^6COOH)_2 \quad (2)$$

In formulas (1) and (2), $R^5$ represents an aliphatic group or aromatic group and a saturated or unsaturated optionally branched alkyl group having 8 to 20 carbon atoms is preferable, and $R^6$ represents a hydrocarbon group containing an aliphatic group or aromatic group, and is preferably an alkylene group optionally having a side chain having 1 to 6 carbon atoms. Furthermore, $R^6COOH$ is typically a fatty acid residue and particularly represents a propionic acid residue.

In the case the carboxylic acid is a thioether monocarboxylic acid, and particularly in the case $R^5$ represents a hydrocarbon group having 10 or more carbon atoms, this may be esterified with a polyvalent alcohol such as ethylene glycol, propylene glycol, hexylene glycol, glycerin, pentaerythritol, trimethylolpropane or sorbitol, or may be esterified with a higher monovalent alcohol such as lauryl alcohol, tridecyl alcohol, stearyl alcohol, oleyl alcohol or isostearyl alcohol. A polyvalent alcohol such as glycerin, pentaerythritol or trimethylolpropane is preferable. Moreover, it may also be a compound obtained by esterifying a thioether monocarboxylic acid with a compound in which a polyether such as polyoxyethylene (PEO) or polyoxypropylene (PPO) is bound to any of these higher monovalent alcohols.

In the case the carboxylic acid is a thioether dicarboxylic acid, it may be esterified with a higher alcohol such as a saturated or unsaturated, optionally branched alcohol having 8 carbon atoms or more and preferably 12 carbon atoms of more, examples of which include 2-ethylhexanol, lauryl alcohol, tridecyl alcohol, cetyl alcohol, stearyl alcohol, oleyl alcohol and isostearyl alcohol. Moreover, it may also be a compound obtained by esterifying a thioether dicarboxylic acid with a compound in which a polyether such as polyoxyethylene (PEO) or polyoxypropylene (PPO) is bound to a higher alcohol.

In addition, a mixed ester obtained by esterifying a thioether monocarboxylic acid and other fatty acids such as oleic acid with the same polyvalent alcohol may also be used for Component A. The molecular weight of Component A is preferably 500 to 1500 and more preferably 550 to 1200.

In the case of imparting the oily component in the form of spinning oil, if the molecular weight is less than 500, the work environment may be impaired as a result of fuming when exposed to high temperatures in the spinning and drawing steps. In addition, if the molecular weight exceeds 1500, friction between the fibers and metal increases leading to damage to the fibers and impairment of fiber quality.

Specific preferable examples of the case in which Component A is an ester of a thioether monocarboxylic acid include hexanediol dioctadecyl thiopropionate, trimethylolpropane tridodecyl thiopropionate, glycerin tridodecyl thiopropionate and pentaerythritol tetraoctadecyl thiopropionate.

Specific preferable examples of the case in which Compound A is an ester of a thioether dicarboxylic acid include dilauryl thiodipropionate, distearyl thiodipropionate, dioleyl thiodipropionate, diisotridecyl thiodipropionate, diisostearyl thiodipropionate, dioctyl thiodipropionate and dioctyl (PEO) thiodipropionate.

Moreover, the cyclohexane-extracted oily component of the base fabric for an air bag of the present invention preferably contains modified silicone (Component B). The adhered amount of Component B is preferably 0.001% by weight to 0.05% by weight based on the weight of the base fabric.

Component B has the effect of assisting in lowering friction by lowering surface energy on the surface of the polyamide yarns. It contributes to improvement of the strength of sewn parts in particular. The amount of Component B is preferably large at 0.001% by weight or more. The amount thereof is preferably 0.05% by weight or less in order to maintain mixing stability as a composition when imparting the oily component. Component B is a silicone compound, and specific examples thereof include silicone compounds such as quaternary ammonium-modified dimethyl polysiloxane, amino-modified dimethyl polysiloxane, amide-modified dimethyl polysiloxane, epoxy-modified dimethyl polysiloxane, carboxy-modified dimethyl polysiloxane, polyoxyalkylene-modified dimethyl polysiloxane or fluorine-modified dimethyl polysiloxane.

In the present invention, Component B is particularly preferably one or more types of silicone compounds selected from dimethyl polysiloxane, amino-modified dimethyl polysiloxane, amide-modified dimethyl polysiloxane and polyoxyalkylene (polyoxyethylene and/or polyoxypropylene, and preferably polyoxyethylene)-modified dimethyl polysiloxane in which the molecular weight thereof is 1,000 to 1,000,000, preferably 3,000 to 1,000,000 and more preferably 5,000 to 1,000,000, and the viscosity thereof at 25° C.

is 2 mm²/s to 1,000,000 mm²/s, preferably 500 mm²/s to 500,000 mm²/s and more preferably 1,000 mm²/s to 500,000 mm²/s.

The amino-modified dimethyl polysiloxane has an amino equivalent (amino equivalent refers to the molecular weight per nitrogen atom) of preferably 1,500 g/mol to 40,000 g/mol, more preferably 2,500 g/mol to 20,000 g/mol and particularly preferably 3,000 g/mol to 10,000 g/mol. The dimethyl polysiloxane is preferably a dimethyl polysiloxane having a viscosity at 25° C. of 10,000 mm²/s to 1,000,000 mm²/s, and the amino-modified dimethyl polysiloxane is preferably that having a viscosity at 25° C. of 100 mm²/s to 20,000 mm²/s. Examples of the polyoxyalkylene-modified dimethyl polysiloxane include compounds represented by the following formula (3) and compounds represented by the following formula (4).

[Chemical 1]

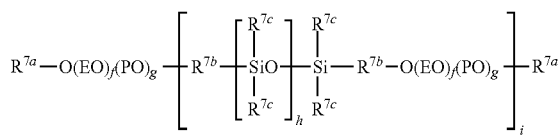

wherein in the above formula, $R^{7a}$ represents a hydrogen atom or monovalent hydrocarbon group, and a hydrogen atom or methyl group is preferable. $R^{7b}$ represents a divalent hydrocarbon group having 1 to 20 carbon atoms, a divalent hydrocarbon group having 3 to 6 carbon atoms is preferable, and an alkylene group is particularly preferable. $R^{7b}$ represents an alkyl group having 1 to 3 carbon atoms or a hydroxyl group, and a methyl group is preferable. EO represents an oxyethylene group and PO represents an oxypropylene group. f represents the average number of moles of oxyethylene group added, g represents the average number of moles of oxypropylene group added, h represents a number of 1 or more on average, i represents a number of 1 or more on average, and although these values are selected to as to yield a desired viscosity, f and g each preferably represent a number of 0 to 60 and more preferably represent a number of 0 to 35. h preferably represents a number of 1 to 500 on average. i preferably represents a number of 1 to 100 on average. Furthermore, a plurality of $R^{7a}$, $R^{7b}$, $R^{7c}$, f, g and h may be the same or different.

[Chemical 2]

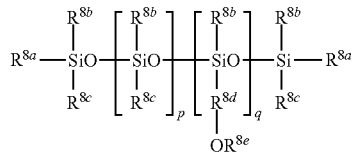

wherein in the above formula, $R^{8a}$ is selected from an alkyl group having 1 to 3 carbon atoms, an alkoxy group having 1 to 3 carbon atoms and a hydroxyl group, and a methyl group is particularly preferable. $R^{8b}$ and $R^{8c}$ are respectively and independently selected from an alkyl group having 1 to 3 carbon atoms and a hydroxyl group, and a methyl group is particularly preferable. p and q represent average degrees of polymerization, and although these values are suitably selected to as to yield a desired viscosity, p is 10 to 10,000 and preferably 10 to 1,000, while q is 1 to 1,000 and preferably 3 to 100. $R^{8d}$ represents an alkylene group having 1 to 3 carbon atoms, and $R^{8e}$ represents a group represented by $-(EO)_j-(PO)_k-L$ (wherein, L represents an alkyl group having 1 to 3 carbon atoms or a hydrogen atom, EO represents an oxyethylene group, PO represents an oxypropylene group, j and k respectively represent their average numbers of moles added, and the total thereof is 1 to 100, preferably 2 to 100 and particularly preferably 2 to 50.

The cyclohexane-extracted oily component preferably also contains a nonionic surfactant (Component C) as an oily component other than Component A and Component B. Component C has the effect of preventing crystal growth of polyamide polymer and local embrittlement on the surface of the polyamide yarns. The polyether moiety of Component C acts as an amorphous polyamide moiety that hinders crystal growth on the polyamide surface. Loop strength is maintained by inhibiting rough hardening of the fiber surfaces, thereby contributing to improvement of sewing utilization rate. Maintaining a high loop strength of the composite yarns even after heat treatment of the base fabric contributes to enhanced retention rate of the strength of sewn parts after the passage of time in the presence of heat. The adhered amount of Component C is preferably large at 0.01% by weight or more and more preferably 0.02% by weight or more. Since smoothing action is insufficient with exclusive Component C, the adhered amount of Component C is preferably 0.2% by weight or less.

Component C in the form of a nonionic surfactant is a nonionic surfactant selected from, for example, a higher alcohol alkylene oxide addition composition and polyvalent alcohol alkylene oxide addition composition having a molecular weight of 1000 to 5000 and preferably 2000 to 3000, and is preferably a component excluding substances belonging to Components A and B. The aforementioned polyvalent alcohol alkylene oxide addition composition is that in which an alkylene oxide such as ethylene oxide, propylene oxide or butylene oxide has been added to a polyvalent alcohol, and specific examples thereof include hydrogenated castor oil ethylene oxide addition composition, castor oil ethylene oxide addition composition, sorbitol ethylene oxide addition composition and trimethylolpropane ethylene oxide addition composition. Among these, hydrogenated castor oil ethylene oxide addition composition, sorbitol ethylene oxide addition composition or higher alcohol alkylene oxide addition composition is preferable.

Moreover, a nonionic surfactant obtained by reacting a monocarboxylic acid and/or dicarboxylic acid with the aforementioned compounds is also preferable. Specific examples of monocarboxylic acids include caproic acid, caprylic acid, lauric acid, palmitic acid, stearic acid, oleic acid and isostearic acid, and palmitic acid, stearic acid, oleic acid and isostearic acid are preferable. Specific examples of dicarboxylic acids include maleic acid, adipic acid, thiodipropionic acid, sebacic acid, dodecanoic acid and brassylic acid, and among these, maleic acid, adipic acid and propionic acid are preferable.

In addition, the nonionic surfactant is also preferably a PEG ester compound having a molecular weight of 600 to 3000. Examples of monocarboxylic acids esterified with diethylene glycol include caproic acid, caprylic acid, lauric acid, palmitic acid, stearic acid, oleic acid and isostearic acid, and preferably include palmitic acid, stearic acid, oleic acid and isostearic acid.

In the case of imparting the oily component in the form of a spinning oil, if the molecular weight is less than 600, there is considerable fuming during hot drawing resulting in impairment of the work environment and eventually causing a decrease in fiber quality. In addition, if the molecular weight exceeds 3000, spreadability of the oil worsens resulting in uneven adhesion to the fibers and inducing single filament breakage.

The base fabric for an airbag of the present invention preferably contains the aforementioned Components A and B in cyclohexane-extracted oily components. Moreover, the respective Components A and B preferably contain components in which the organic/inorganic ratio is 1.50 to 1.70, and the total content thereof is preferably 7% by weight or more based on the total amount of oily components.

Here, the organic/inorganic ratio is in accordance with the organic conceptual diagram of Atsushi Fujita, and was calculated based on "Organic Conceptual Diagram—Foundation and Application" (New Edition, Sankyo Publishing Co., Ltd., Yoshio Koda et al., ed., published: Nov. 30, 2008). However, inorganic and organic calculations for compounds containing silicon were in accordance with "Positioning of Fluorine and Silicon in Organic Conceptual Diagram (Hakuji Katsura, Petrochemistry, #36(12), 961 (1987)).

Substances having similar organic/inorganic ratios are compatible. If the organic/inorganic ratio of a component is 1.50 to 1.70, it is close to the organic/inorganic ratio of polyhexamethylene adipamide, and that component has superior compatibility with respect to polyamide yarns thereby demonstrating favorable adsorption and permeability. If such components adsorb and permeate into the surface of polyamide yarns, they easily remain on the surface of fabric fibers even after going through water jet loom and scouring steps, while additionally contributing to inhibition of decreases in physical properties after the passage of time in the presence of heat.

Component A demonstrates both a smoothness improving effect and antioxidant effect. As a result of subjecting an airbag to heat treatment, polymer chains tend to be severed due to oxidative degradation of polyamide polymer on the surfaces of composite yarns of the base fabric, and the formation of microcracks tends to cause a decrease in loop strength. However, Component A contributes to inhibition of this degradation under high-temperature environmental conditions. Therefore, if the organic/inorganic ratio of Component A is within the proper range of 1.50 to 1.70, Component A easily remains on the surface of the polyamide yarns, is resistant to being volatilized and dissipated, and is able to demonstrate its smoothness improving effect and antioxidant effect on the surface, thereby contributing to maintaining tensile strength after the passage of time in the presence of heat and further contributing to inhibition of increases in the yarn-to-yarn friction index.

If the organic/inorganic ratio of Component B is within the proper range of 1.50 to 1.70, it also easily remains on the surface of the polyamide yarns even after the passage of time in the presence of heat, and contributes to inhibiting increases in the yarn-to-yarn friction index by reducing surface energy on the surface of the yarns. If the total amount of components among Components A and B for which the organic/inorganic ratio is 1.50 to 1.70 is 7% by weight or more based on the total amount of oily components, then the value of yarn-to-yarn friction index after the passage of time in the presence of heat is held to a low value.

In addition, if the organic/inorganic ratio of Component C is within the proper range of 1.50 to 1.70, it easily remains on the surface of polyamide yarns even after the passage of time in the presence of heat, and contributes to maintaining loop strength by inhibiting crystal growth of polyamide on the surface of the yarns. If the total amount of components among Components A, B and C for which the organic/ inorganic ratio is 1.50 to 1.70 is 10% by weight or more based on the total amount of oily components, then this can contribute to maintaining the strength of sewn parts after the passage of time in the presence of heat.

In order to retain oily components of the aforementioned specific composition in the base fabric, the composite contents of spinning oil in the form of an oily agent and the weight ratio distribution thereof should be suitably adjusted and fed during spinning of the polyamide fibers. As a result, the composition of oily components derived from spinning oil remaining in the woven fabric after weaving can be made to have the aforementioned contents. Adsorption and permeation into the fiber surfaces are preferably promoted by hot drawing in the spinning step of the polyamide yarns. In addition, oily components having the aforementioned composition can also be retained in the woven fabric by imparting oily components to the woven fabric after weaving.

The composition of the oily agent in the form of spinning oil during spinning is preferably such that Component A is contained at 40 parts by weight to 80 parts by weight, Component B is contained at 0.5 parts by weight to 5 parts by weight, and Component C is contained at 5 parts by weight to 55 parts by weight. Moreover, by containing a suitable amount of a composition in which the organic/ inorganic ratio of each component is within the proper range of 1.50 to 1.70, each component can be allowed to adequately remain on the fiber surfaces after weaving processing steps. Containing Components A and C as essential components, and containing components among Components A, B and C for which the organic/inorganic ratio is within the proper range of 1.50 to 1.70 at 5% by weight or more based on the total weight of the oily agent composition contributes to improvement of sewing strength.

In the present invention, a so-called antioxidant may also be contained in the imparted oily components. A hindered phenol type of antioxidant is used for the antioxidant. This type of antioxidant contributes to improvement of heat resistance of the treatment agents by acting synergistically with the thioether of the present invention. Hindered phenol type antioxidants include compounds having one or more substituted aromatic groups, having a bulky substituent in the manner of a t-butyl group at the ortho position of a phenolic OH group, in a molecule thereof, and those having a molecular weight of 500 or more in which the benzene core is substituted with one or more methyl groups and tertiary butyl groups are preferable. Specific examples thereof include 1,1,3-tris-(2-methyl-4-hydroxy-5-t-butyl-phenyl)butane (trade name: ADK Stab A0-30) and 1,3,5-tris (4-t-butyl-3-hydroxy-2,6-dimethylbenzyl)isocyanurate (trade name: Cyanox 1790). The ratio at which the antioxidant is distributed in the oily components is 0.1% by weight or more and results in improvement of heat resistance, while a ratio of less than 3% by weight prevents an excessive increase yarn-to-yarn friction index.

In the melt spinning step, in the case of melt spinning the aforementioned polymer and imparting the aforementioned oily agents to the resulting cooled and solidified yarns, the aforementioned oily agent components are normally imparted in the form of a solution that has been emulsified and diluted with a low molecular weight mineral oil or water. The amount of oily agent adhered to the fibers is 0.3% by weight to 1.5% by weight and preferably 0.5% by weight to 1.0% by weight. Threads to which the aforementioned oily agents are imparted are preferably fed continuously to the drawing step where they undergo hot drawing treatment. Multistage hot drawing consisting of two or more stages is normally employed for drawing. Although the drawn threads are wound up after heat setting, the yarns are subjected to interlacing immediately prior to winding to mutually converge into filaments. Interlacing is carried out by spraying a high-pressure fluid such as high-pressure air or steam from the outer periphery of the yarns through a nozzle.

Raw yarn for weaving produced according to the aforementioned method preferably has strength of 8.0 cN/dtex or more, more preferably 8.3 cN/dtex or more and even more preferably 8.5 cN/dtex or more. The high strength of the raw yarn contributes to enhancing tensile strength of the base fabric after the weaving step. On the other hand, the strength thereof is preferably 10.0 cN/dtex or less, more preferably 9.5 cN/dtex or less and even more preferably 9.0 cN/dtex or less. As a result of making the strength to be 10.0 cN/dtex or less, there is less likelihood of impairment of loop strength of composite yarns of the base fabric after the weaving step.

A portion of the raw yarn produced according to the aforementioned method is sent to a warping step after which it is rewound onto a warping beam, or a portion thereof is prepared as weft yarn followed by weaving. At least a portion of the extracted oily agents in the aforementioned woven fabric may be imparted as warping oil in the warping step. In addition, at least a portion of the extracted oily agent in the aforementioned woven fabric may also be imparted to the woven fabric as processing oil after weaving.

A water jet loom, air jet loom or rapier loom and the like can be used for weaving. In the case of a water jet loom, the woven fabric is efficiently woven at a weft yarn picking speed of about 800 rpm or more and preferably 1000 rpm or more. Normally, a portion of the oily agents adhered to the raw yarn is removed during this weaving, and the amount of residual oily components is less than 0.3% by weight. Since oily agents imparted to the raw yarn according to the present invention are composed of the aforementioned oily agent components, a portion thereof is easily removed by water during water jet weaving, thereby lowering aqueous viscosity and preventing the formation of scum and the like.

The woven gray fabric is then heat set after going through a scouring step or without going through a scouring step. In the heat setting step, calendering processing may be carried out on one side or both sides in order to control air permeability or control texture and softness for use as a base fabric for an air bag.

The base fabric for an airbag of the present invention is preferably a high-density fabric having a cover factor of 2000 or more so that the air permeability thereof is less than 0.5 cc/cm$^2$/sec. For example, in the case of weaving by plain weaving using 420 denier Nylon 66 raw thread, the number of picks is preferably 50 or more per inch for both the warp and weft directions. More preferably, the base fabric for an airbag is a high-density fabric having a cover factor of 2100 or more. Cover factor is calculated as [(warp yarn fineness (dtex))$^{1/2}$×warp yarn density (yarns/2.54 cm)+(weft yarn fineness (dtex))$^{1/2}$×weft yarn density (yarns/2.54 cm)].

An air bag can be obtained by using the aforementioned woven fabric as an airbag base fabric and sewing. In addition, an airbag base fabric having enhanced air impermeability can also be obtained by coating with an elastomer or resin. Here, it is important that the woven fabric serving as the airbag base fabric is such that at least a portion of the aforementioned oily agent components remain within the woven fabric, and contains 0.01% by weight to 0.15% by weight of cyclohexane-extracted oily components.

This airbag can be incorporated in a vehicle in the form of an airbag device. It is particularly preferably used as a side curtain airbag or side impact air bag and the like.

EXAMPLES

Although the following provides a detailed explanation of the present invention through examples and reference examples thereof, the present invention is not limited to only these examples.

(Formulation of Finishing Agent Compositions)

Individual components of the finishing agent compositions used for spinning oil were formulated in the manner indicated below.

Higher Fatty Acid Esters:
  a1: Dioctyl alcohol EO5 thiodipropionic acid ester
  a2: Dioctyl alcohol EO20 thiodipropionic acid ester
  a3: EO50 trimethylolpropane triisostearic acid Modified Silicones:
  b1: EO10-modified silicone (30,10)
  b2: EO10-modified silicone (5,35)
  b3: Dilauric acid-modified polydimethyl silicone (7) ester Nonionic Surfactants:
  c1: EO50 hydrogenated castor oil
  c2: EO100 hydrogenated castor oil
  c3: Stearic acid EO20 ester
  c4: Stearic acid EO40 ester Furthermore, among the aforementioned higher fatty acid esters, those esters having a thioether group corresponding to the aforementioned Component A in the present invention are esters a1 and a2, while ester a3 does not have a thioether group and therefore does not correspond to Component A. In the subsequently indicated Tables 2 and 3, the adhered amounts of ester components refers to the total adhered amount of esters a1, a2 and a3, while the adhered amount of Component A refers to the total adhered amount of esters a1 and a2.

Next, finishing agent compositions 1 to 15 were compiled and formulated as shown in Table 1. The formulated amounts in parts by weight and organic/inorganic ratios (I/O) of individual components are shown in Table 1. Those components for which the (I/O) value of a single fiber was within the suitable range of 1.5 to 1.7 are a2, b2, b3, c2 and c4.

TABLE 1

| | Component | I/O | C1 | C2 | C3 | C4 | C5 | C6 | C7 | C8 | C9 | C10 | C11 | C12 | C13 | C14 | C15 |
|---|---|---|---|---|---|---|---|---|---|---|---|---|---|---|---|---|---|
| A. Higher | a1 | 0.95 | 48 | 55 | 0 | 0 | 48 | 65 | 75 | 55 | 0 | 55 | 0 | 0 | 0 | 0 | 0 |
| fatty acid | a2 | 1.51 | 12 | 5 | 7 | 3 | 12 | 10 | 8 | 5 | 7 | 5 | 7 | 7 | 3 | 3 | 14 |
| ester | a3 | 1.20 | 0 | 0 | 53 | 57 | 0 | 0 | 0 | 0 | 53 | 0 | 53 | 77 | 57 | 75 | 69 |
| B. | b1 | 1.10 | 1.5 | 1.5 | 1.5 | 1.5 | 1.5 | 1.5 | 1.5 | 1.5 | 1.5 | 0 | 1.5 | 0 | 1.5 | 1.5 | 1.5 |
| Modified | b2 | 1.60 | 0.5 | 0.5 | 0 | 0 | 0.5 | 0.5 | 0.5 | 0.5 | 0 | 0 | 0 | 0 | 0 | 0 | 0 |
| silicone | b3 | 1.63 | 0 | 0 | 0.5 | 0.5 | 0 | 0 | 0 | 0 | 0.5 | 0 | 0.5 | 0 | 0.5 | 0.5 | 0.5 |
| C. | c1 | 1.21 | 20 | 20 | 20 | 20 | 20 | 15 | 15 | 20 | 20 | 20 | 20 | 15 | 20 | 15 | 15 |
| Nonionic | c2 | 1.52 | 6 | 6 | 6 | 6 | 1 | 0 | 0 | 1 | 1 | 8 | 8 | 0 | 1 | 0 | 0 |
| surfactant | c3 | 1.33 | 10 | 10 | 10 | 10 | 17 | 8 | 0 | 17 | 17 | 12 | 10 | 0 | 17 | 5 | 0 |
| | c4 | 1.56 | 2 | 2 | 2 | 2 | 2 | 0 | 0 | 0 | 0 | 0 | 0 | 0 | 0 | 0 | 0 |

TABLE 1-continued

| Component | I/O | C1 | C2 | C3 | C4 | C5 | C6 | C7 | C8 | C9 | C10 | C11 | C12 | C13 | C14 | C15 |
|---|---|---|---|---|---|---|---|---|---|---|---|---|---|---|---|---|
| Content of components having proper I/O % | 1.5-1.7 | 20.5 | 13.5 | 7.0 | 11.5 | 13.5 | 10.5 | 8.5 | 6.5 | 8.5 | 13.0 | 15.3 | 7.1 | 4.5 | 3.5 | 14.5 |

Components:
a1: Dioctyl alcohol EO5 thiodipropionic acid ester
a2: Dioctyl alcohol EO20 thiodipropionic acid ester
a3: EO50 trimethylolpropane triisostearic acid
b1: EO10-modified silicone (30, 10) methyl capryl siloxane (10)-methyl EO5 methyl siloxane (30) copolymer (having trimethyl groups on both ends)
b2: EO10-modified silicone (5, 35) dimethyl siloxane-methyl EO5 methyl siloxane (35) copolymer (having trimethyl groups on both ends)
b3: Dilauric acid-modified polydimethyl silicone (7) oil methyl dilaurate EO20 methyl siloxane (7) ester (having methylol ester groups on both ends)
c1: EO50 hydrogenated castor oil (total of 40 EO groups)
c2: EO100 hydrogenated castor oil (total of 100 EO groups)
c3: EO20 stearic acid ester
c4: EO40 stearic acid EO40 ester (Spinning)

Hexamethylene adipamide, containing 50 ppm of copper as elemental copper and 1500 ppm of iodine and having sulfuric acid viscosity as determined with 98% sulfuric acid of 3.5, was subjected to melt spinning and hot drawing followed by feeding with spinning oil in the form of the aforementioned finishing agents and winding. Physical properties of the resulting yarns consisted of fineness of 470 dtex, filament number of 144 and tensile strength of 8.5 cN/dtex.

(Analysis of Woven Fabric Oily Components)

The base fabric composed of polyamide yarns was subjected to Soxhlet extraction using cyclohexane for the solvent (extracted 10 times for 3 hours at 60° C.). After distilling off volatile components from the resulting extract, the extract was weighed followed by determination of the ratio with the weight of the base fabric prior to extraction as the amount of cyclohexane-extracted oily components (percent by weight).

Next, the extracted oily components were isolated and analyzed by HPLC (HP1100, Yokogawa Analytical Systems Inc.) using a GPC column (AsahiPack GF-310HQ, Showa Denko K.K.). A mixed liquid of aqueous ammonium acetate and acetonitrile was used according to the gradient method for the mobile phase. Detection was carried out by TIC according to the electrospray method using a mass spectrometer (MS) (HP1100MSD, Yokogawa Analytical Systems Inc.). Identification of isolated substances was carried out by Matrix-assisted Laser Desorption/Ionization Time of Flight (MALDI-TOF) analysis (Shimadzu Corp.).

(Base Fabric Properties)

Crimp after passage of time in presence of heat: Base fabric samples were treated for 400 hours in a air circulating oven at 140° C. followed by determination of crimp percentage (%) of the weaving yarn in accordance with JIS L1096:2010-8.7b) Method B for use as crimp (%), and after obtaining values for the base fabric samples in each of the warp and weft directions, the value obtained by subtracting the crimp in the weft direction from the crimp in the warp direction was defined as the difference in crimp (%).

Tensile strength: Tensile strength (N/cm) was determined by determining tensile strength (N/cm) in accordance with Method A of JIS L1096:2010-8.14.1 JIS Method a) (strip method) followed by obtaining the average value of the warp and weft directions. A constant rate of extension type of tensile test was carried out at a sample width of 25 mm, clamped length of 200 mm and pulling speed of 200 mm/min.

Tensile strength after passage of time in presence of heat: Tensile strength (N/cm) was evaluated in the manner described above after treating a sample strip of the base fabric for 400 hours in a hot air dryer at 140° C. followed by determination of the average value of the warp and weft directions to obtain tensile strength after the passage of time in the presence of heat.

Yarn-to-yarn friction index of composite yarns: Sample yarns of unraveled samples obtained by unraveling the base fabric were twisted three times as shown in FIG. 1 and the unraveled yarn samples were rubbed together at the rate of 3 cm/min. The load (T1) on the load side with the twisted portion interposed there between was set to 140 g, tension on the side measured with a tension meter (T2) was measured, and the ratio of T2/T1 was taken to be the yarn-to-yarn friction index. The average value of unraveled yarns in the warp and weft directions was obtained and taken to be the yarn-to-yarn friction index of the composite yarns.

Yarn-to-yarn friction index of composite yarns after the passage of time in the presence of heat: Unraveled samples obtained by unraveling the base fabric were treated for 400 hours in an air circulating oven at 140° C. followed by evaluating yarn-to-yarn friction index of composite yarns in the manner described above and using the average value in the warp and weft direction as the yarn-to-yarn friction index after the passage of time in the presence of heat.

Composite yarn loop strength: Using unraveled samples obtained by unraveling the base fabric, loop strength (N) was determined in accordance with JIS L1013:2010-8.7.1 followed by obtaining the average value in the warp and weft directions for use as the composite yarn loop strength (N).

Loop strength after passage of time in presence of heat: Unraveled samples obtained by unraveling the base fabric were treated for 400 hours in a hot air dryer at 140° C. followed by evaluating the aforementioned composite yarn loop strength and using the average value of the warp and weft directions as the loop strength (N) after the passage of time in the presence of heat.

(Overall Evaluation)

A test of stitch strength by forming stitches in the base fabric (for the purpose of determining the strength of sewn portions) was carried out using a method in compliance with ISO13935-1 (strip method). Base fabric samples were superimposed so as to be facing each other with the sewn sites in the center followed by sewing together starting from the end with a seal allowance of 20 mm. The width of the sample strips was 25 mm.

Neophil Bonded Nylon TEX135 thread (Coats Inc.) was used for the upper and lower sewing thread.

Sewing: Two sample pieces were aligned in the warp and weft directions and subjected to lock stitching at 45 stiches/10 cm while allowing a seam allowance of 2 cm from the end of the sample pieces. At the end of the sewing line, the upper and lower sewing threads were tied together with a square knot. DP×17 size 20 needles manufactured by Organ Needle Co., Ltd. were used for the sewing needles.

The sewn samples were clamped so that the stitched portions were in the center between upper and lower jigs followed by carrying out a constant rate of extension type of tensile test at a clamped length of 100 nm and pulling speed of 300 mm/min to determine the strength of sewn parts (N/cm).

Sewing utilization rate: The ratio of the strength of sewn parts to the strength of non-sewn parts was defined as sewing utilization rate (%).

Sewing utilization rate after passage of time in presence of heat: Sewn samples were heated for 400 hours in an air circulating oven at 140° C. followed by determination of the strength of sewn parts (N/cm) after heat treatment and subsequently determining the ratio of the strength of sewn parts after heat treatment to that before heat treatment as the retention rate of the strength of sewn parts after the passage of time in the presence of heat (%).

(Evaluation of Airbag Deployment)

Bag fabrication: An airbag was sewn as described in International Publication No. WO 99/28164. However, two rows of double chain stitching using 235 dtex/2×3 sewing thread at 5.0 stitches/cm were used for sewing the outer periphery and a vent hole was not provided. After exposing this airbag to a temperature of 140° C. for 400 hours, the resulting air bag was used as a deployment test sample. A retainer was inserted into the resulting airbag and an inflator was attached to obtain a deployment test sample. A pyro-type inflator having a 60 L tank pressure and output of 200 kPa was used for the inflator.

Deployment conditions: Pressure inside the airbag was monitored through the retainer bolt used to attach the airbag to the inflator, and the status of inflator deployment was observed using a high-speed video camera. The deployment test sample was first allowed to stand overnight at 80° C. and then promptly attached to a deployment stand so as not to allow the temperature to drop followed by carrying out a high-temperature ignition and deployment test.

Evaluation: Evaluation was carried out by evaluating burst-free deployment or deployment without any subsequent occurrence of problems with the bag body as "A", evaluating burst-free deployment with observance of broken threads at sewn parts of the bag body as "B", and evaluating burst of the bag as "C".

Example 1

Polyhexamethylene adipamide fibers obtained with finishing agent composition 1 were used as weaving raw yarn to carry out warping in the absence of twisting and sizing and prepare a warp beam. In addition, weft yarn was supplied to a loom in the absence of twisting and sizing. The yarn was plain woven at 800 rpm with a water jet loom. This was then subjected to heat setting without scouring or drying. Heat setting was carried out for 1 minute at 50° C. and then for 1 minute at 180° C. while setting overfeed in the warp direction corresponding to the lengthwise direction of the roll to 3.0% and setting narrowing in the weft direction corresponding to the widthwise direction of the roll to 5.0% to obtain a base fabric for an airbag having weaving density of 51 yarns/2.54 cm in both the warp and weft directions. The difference in crimps of the base fabric between the warp and weft directions was 2.5%.

The amount of oily components adhered to the base fabric, physical properties of the base fabric, sewing evaluation values and the results of evaluating airbag deployment are shown in Table 2. The amount of adhered oily components includes a smoothing component composed of an ester compound not having a thioether group, is adequate for the adhered amount of an ester compound having thioether group in the form of Component A, and is also adequate for the adhered amount of Component C. The base fabric has a high sewing utilization rate and high strength retention rate for sewn parts after the passage of time in the presence of heat. Therefore, when high-load deployment of the airbag was evaluated after the passage of time in the presence of heat, the airbag deployed without any problems such as those involving the bag body.

Example 2

A base fabric was obtained by weaving in the same manner as Example 1 with the exception of carrying out heat setting while setting overfeed in the warp direction corresponding to the lengthwise direction of the roll to 3.5% and setting widening in the weft direction corresponding to the widthwise direction of the roll to 6.0%. The results are shown in Table 2. The difference in crimps of the base fabric between the warp and weft directions was 0.5%. As shown in Table 2, this base fabric has a high sewing utilization rate and high strength retention rate for sewn parts after the passage of time in the presence of heat. There were also no problems during high-load deployment of the air bag after the passage of time in the presence of heat.

Examples 3 and 4

Examples 3 and 4 were carried out in the same manner as Example 1 with the exception of using finishing agent composition 2 (Example 3) and finishing agent composition 3 (Example 4). The results are shown in Table 2. As shown in Table 2, the amount of adhered oily components includes a smoothing component composed of an ester compound not having a thioether group, is adequate for the adhered amount of an ester compound having thioether group in the form of Component A, and is also adequate for the adhered amount of Component C. The base fabrics have high sewing utilization rates and high strength retention rates for sewn parts after the passage of time in the presence of heat. There were also no problems during high-load deployment of the air bags after the passage of time in the presence of heat.

Examples 5 to 7

Plain woven fabrics were obtained in the same manner as Example 1 using finishing agent composition 1 (Example 5), finishing agent composition 2 (Example 6) and finishing agent composition 3 (Example 7). Base fabrics were then obtained by weaving using these plain woven fabrics in the same manner as Example 1 with the exception of subjecting to heat setting while setting overfeed in the warp direction corresponding to the lengthwise direction of the roll to 2.5% and setting widening in the weft direction corresponding to the widthwise direction of the roll to 3.5%. The results are shown in Table 2. As shown in Table 2, the amount of adhered oily components includes a smoothing component composed of an ester compound not having a thioether group, is adequate for the adhered amount of an ester compound having thioether group in the form of Component A, and is also adequate for the adhered amount of Component C. The base fabrics have high sewing utilization rates and high strength retention rates for sewn parts after the passage of time in the presence of heat. There were also no problems during high-load deployment of the air bags after the passage of time in the presence of heat. In Example 7, the effect of the difference in crimps in the warp and weft directions was observed to a small degree, and broken weaving threads were observed around the needle holes of sewn parts following deployment.

Comparative Examples 1 to 3

Plain woven fabrics were obtained in the same manner as Example 1 using finishing agent composition 1 (Comparative Example 1), finishing agent composition 2 (Comparative Example 2) and finishing agent composition 3 (Comparative Example 3). Base fabrics were then obtained by weaving in the same manner as Example 1 with the exception of subjecting to heat setting treatment while setting overfeed in the warp direction corresponding to the lengthwise direction of the roll to 1.5% and setting widening in the weft direction corresponding to the widthwise direction of the roll to 0.5%. The results are shown in Table 2. As shown in Table 2, the amount of adhered oily components includes a smoothing component composed of an ester compound not having a thioether group, is adequate for the adhered amount of an ester compound having thioether group in the form of Component A, and is also adequate for the adhered amount of Component C. However, the difference in crimps was large and the base fabrics demonstrated low sewing utilization rates and low strength retention rates for sewn parts after the passage of time in the presence of heat. The resulting airbags ended up rupturing during high-load deployment after the passage of time in the presence of heat.

Comparative Example 4

Comparative Example 4 was carried out in the same manner as Comparative Example 1 with the exception of using composition 4 for the finishing agent composition. The results are shown in Table 2. As shown in Table 2, the difference in crimps was large and the amount of adhered oily components was insufficient for Component A. The base fabric demonstrated a low sewing utilization rate and low strength retention rate for sewn parts after the passage of time in the presence of heat. The resulting airbag ended up rupturing during high-load deployment after the passage of time in the presence of heat.

Comparative Example 5

Comparative Example 5 was carried out in the same manner as Example 5 with the exception of using composition 4 for the finishing agent composition. The results are shown in Table 2. As shown in Table 2, although the difference in crimps was somewhat reduced, the amount of adhered oily components was insufficient for Component A. The base fabric demonstrated a low sewing utilization rate and low strength retention rate for sewn parts after the passage of time in the presence of heat. The resulting airbag ended up rupturing during high-load deployment after the passage of time in the presence of heat.

TABLE 2

| | | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| Finishing agent | Applied composition | 1 | 1 | 2 | 3 | 1 | 2 | 3 | 1 |
| Adhered oily components | Adhered amount wt % | 0.10 | 0.10 | 0.09 | 0.07 | 0.10 | 0.09 | 0.07 | 0.10 |
| | Adhered amount of ester component wt % | 0.060 | 0.060 | 0.043 | 0.048 | 0.060 | 0.043 | 0.048 | 0.060 |
| | Adhered amount of Component A wt % | 0.060 | 0.060 | 0.042 | 0.020 | 0.060 | 0.040 | 0.020 | 0.060 |
| | Adhered amount of Component B wt % | 0.002 | 0.002 | 0.002 | 0.002 | 0.002 | 0.002 | 0.002 | 0.002 |
| | Adhered amount of Component C wt % | 0.040 | 0.040 | 0.040 | 0.040 | 0.040 | 0.040 | 0.040 | 0.040 |
| Base fabric properties | Warp/weft crimp difference % | 2.5 | 0.5 | 2.5 | 2.5 | 5.0 | 5.0 | 5.0 | 8.7 |
| | Tensile strength N/cm | 620 | 620 | 590 | 610 | 620 | 590 | 610 | 620 |
| | Tensile strength after heating N/cm | 550 | 550 | 545 | 525 | 550 | 545 | 525 | 550 |
| | Composite thread yarn-to-yarn friction index | 2.00 | 2.00 | 2.20 | 2.15 | 2.00 | 2.30 | 2.15 | 2.00 |
| | Composite yarn yarn-to-yarn friction index after heating | 2.50 | 2.50 | 2.70 | 3.10 | 2.50 | 2.70 | 3.10 | 2.50 |
| | Composite yarn loop strength cN/dtex | 11.8 | 11.8 | 11.2 | 11.0 | 11.8 | 11.2 | 11.0 | 11.8 |
| | Composite yarn loop strength after heating cN/dtex | 8.5 | 8.5 | 8.0 | 6.3 | 8.5 | 8.0 | 6.3 | 8.5 |
| Sewn part strength | Sewing utilization rate % | 90 | 90 | 85 | 83 | 83 | 76 | 75 | 68 |
| | Strength retention rate after heating % | 95 | 95 | 93 | 81 | 85 | 82 | 75 | 68 |
| Deployment | Pyro proximate deployment after heating | A | A | A | A | A | A | B | C |

TABLE 2-continued

|  |  | Comp. Ex. 2 | Comp. Ex. 3 | Comp. Ex. 4 | Comp. Ex. 5 | Ex. 19 | Ex. 20 |
|---|---|---|---|---|---|---|---|
| Finishing agent | Applied composition | 2 | 3 | 4 | 4 | 1 | 2 |
| Adhered oily components | Adhered amount wt % | 0.09 | 0.07 | 0.06 | 0.06 | 0.10 | 0.09 |
|  | Adhered amount of ester component wt % | 0.043 | 0.048 | 0.038 | 0.038 | 0.060 | 0.043 |
|  | Adhered amount of Component A wt % | 0.040 | 0.020 | 0.010 | 0.010 | 0.060 | 0.042 |
|  | Adhered amount of Component B wt % | 0.002 | 0.002 | 0.002 | 0.002 | 0.002 | 0.002 |
|  | Adhered amount of Component C wt % | 0.040 | 0.040 | 0.040 | 0.040 | 0.00 | 0.040 |
| Base fabric properties | Warp/weft crimp difference % | 8.7 | 8.7 | 8.7 | 5.0 | 7.5 | 7.5 |
|  | Tensile strength N/cm | 590 | 610 | 590 | 590 | 620 | 590 |
|  | Tensile strength after heating N/cm | 545 | 525 | 490 | 490 | 550 | 545 |
|  | Composite thread yarn-to-yarn friction index | 2.30 | 2.15 | 2.35 | 2.35 | 2.00 | 2.20 |
|  | Composite yarn yarn-to-yarn friction index after heating | 2.70 | 3.10 | 3.50 | 3.50 | 2.50 | 2.70 |
|  | Composite yarn loop strength cN/dtex | 11.2 | 11.0 | 10.5 | 10.2 | 11.8 | 11.2 |
|  | Composite yarn loop strength after heating cN/dtex | 8.0 | 6.3 | 3.5 | 3.5 | 8.5 | 8.0 |
| Sewn part strength | Sewing utilization rate % | 64 | 62 | 57 | 67 | 75 | 70 |
|  | Strength retention rate after heating % | 64 | 57 | 50 | 58 | 74 | 72 |
| Deployment | Pyro proximate deployment after heating | C | C | C | C | B | B |

Examples 8 to 16

Examples 8 to 16 were carried out in the same manner as Example 1 with the exception of using compositions 5 to 11, composition 15 and composition 12 for the finishing agent compositions as shown in Table 3. The amount of oily components adhered to the base fabric, physical properties of the base fabric, sewing evaluation values and the results of evaluating airbag deployment are shown in Table 3. Differences in crimps of the base fabrics were small, the amount of adhered oily components was adequate and the airbags did not rupture even during high-load deployment after the passage of time in the presence of heat. In Examples 10, 15 and 16, the adhered amount of oily component C was somewhat low and sewing utilization rate was also somewhat low. In Example 16, although the airbag did not rupture, broken weaving threads were observed around the needle holes of sewn parts following deployment.

Comparative Example 6

Comparative Example 6 was carried out in the same manner as Example 1 with the exception of using composition 4 for the finishing agent composition. The results are shown in Table 3. As shown in Table 3, although the difference in crimps of the base fabric was small, with respect to adhered amounts of oily components, although there was a large amount of the smoothing component composed of an ester compound, the amount of Component A, which is a thioether ester compound that contributes to heat resistance, was insufficient. Although the sewing utilization rate of the base fabric was favorable, strength retention rate for sewn parts after the passage of time in the presence of heat was low. The resulting airbag ended up rupturing during high-load deployment after the passage of time in the presence of heat.

Comparative Examples 7 and 8

Comparative Examples 7 and 8 were carried out in the same manner as Example 1 with the exception of using compositions 13 and 14 for the finishing agent compositions as shown in Table 3. The results are shown in Table 3. Although differences in crimps of the base fabrics were small, the adhered amount of Component A among the adhered oily components was inadequate, and the airbag ended up rupturing during high-load deployment after the passage of time in the presence of heat.

Comparative Example 9

Comparative Example 9 was carried out in the same manner as Example 1 with the exception of using composition 13 for the finishing agent composition as shown in Table 3, and immersing for 3 minutes in a warm water bath at 80° C. containing 0.5 g/l of sodium alkylbenzene sulfonate and 0.5 g/l of sodium carbonate after weaving followed by immersing for 2 minutes in boiling water and finally drying at 130° C. to obtain a base fabric. Although there was hardly any difference in crimps of the base fabric as a result of shrinking with boiling water, the adhered amount of oily components was extremely low due to vigorous scouring, and the airbag ended up rupturing during high-load deployment after the passage of time in the presence of heat.

Examples 17 and 18

Polyhexamethylene adipamide fibers obtained with finishing agent composition 3 were used as weaving raw yarn to carry out warping in the absence of twisting and sizing and prepare a warp beam. In addition, weft yarn was supplied to a loom in the absence of twisting and sizing. The yarn was plain woven at 800 rpm with a water jet loom. This was then dried at 60° C. without scouring to obtain airbag base fabrics without subjecting to heat setting. Weaving density was set so that weaving density in the warp direction was higher during weaving to obtain an airbag base fabric in which weaving density in the warp direction was 55 yarns/2.54 cm and that in the weft direction was 47 yarns/2.54 cm (Example 17), and an airbag base fabric in which weaving density in the warp direction was 54 yarns/2.54 cm and that in the weft direction was 50 yarns/2.54 cm (Example 18). Differences in crimps in the warp and weft directions of the base fabrics were 3.0% (Example 17) and 4.0% (Example 18).

The amount of oily components adhered to the base fabric, physical properties of the base fabric, sewing evaluation values and the results of evaluating airbag deployment are shown in Table 3. The amount of adhered oily components includes a smoothing component composed of an ester compound not having a thioether group, is adequate for the adhered amount of an ester compound having thioether group in the form of Component A, and is also adequate for the adhered amount of Component C.

Although the average tensile strength of the base fabrics decreased somewhat due to the differences in weaving density in the warp and weft directions, and the average tensile strength of the base fabrics after the passage of time in the presence of heat also decreased somewhat since heat setting was not carried out, the airbag deployed without any problems such as those involving the bag body.

TABLE 3

| | | Ex. 8 | Ex. 9 | Ex. 10 | Ex. 11 | Ex. 12 | Ex. 13 | Ex. 14 | Ex. 15 |
|---|---|---|---|---|---|---|---|---|---|
| Finishing agent | Applied composition | 5 | 6 | 7 | 8 | 9 | 10 | 11 | 15 |
| Adhered oily components | Adhered amount wt % | 0.09 | 0.08 | 0.08 | 0.07 | 0.06 | 0.09 | 0.07 | 0.06 |
| | Adhered amount of ester component wt % | 0.060 | 0.063 | 0.062 | 0.043 | 0.048 | 0.043 | 0.048 | 0.077 |
| | Adhered amount of Component A wt % | 0.060 | 0.060 | 0.060 | 0.042 | 0.020 | 0.042 | 0.020 | 0.042 |
| | Adhered amount of Component B wt % | 0.002 | 0.002 | 0.002 | 0.002 | 0.002 | 0.000 | 0.000 | 0.002 |
| | Adhered amount of Component C wt % | 0.020 | 0.010 | 0.007 | 0.020 | 0.020 | 0.040 | 0.040 | 0.007 |
| Base fabric properties | Warp/weft crimp difference % | 2.5 | 2.5 | 2.5 | 2.5 | 2.5 | 2.5 | 2.5 | 2.5 |
| | Tensile strength N/cm | 620 | 620 | 620 | 590 | 610 | 590 | 610 | 620 |
| | Tensile strength after heating N/cm | 550 | 550 | 550 | 545 | 525 | 545 | 525 | 545 |
| | Composite yarn yarn-to-yarn friction index | 2.05 | 2.15 | 2.05 | 2.35 | 3.25 | 2.30 | 2.20 | 1.95 |
| | Composite yarn yarn-to-yarn friction index after heating | 2.70 | 2.80 | 2.90 | 2.90 | 3.30 | 2.70 | 3.10 | 3.30 |
| | Composite yarn loop strength cN/dtex | 11.1 | 10.5 | 9.6 | 10.0 | 10.5 | 11.0 | 10.8 | 10.0 |
| | Composite thread loop strength after heating cN/dtex | 8.5 | 8.5 | 8.0 | 8.2 | 6.3 | 8.0 | 7.0 | 7.0 |
| Sewn part strength | Sewing utilization rate % | 85 | 80 | 70 | 75 | 76 | 80 | 78 | 70 |
| | Strength retention rate after heating % | 95 | 95 | 95 | 92 | 82 | 92 | 84 | 91 |
| Deployment | Pyro proximate deployment after heating | A | A | A | A | A | A | A | A |

| | | Ex. 16 | Comp. Ex. 6 | Comp. Ex. 7 | Comp. Ex. 8 | Comp. Ex. 9 | Ex. 17 | Ex. 18 |
|---|---|---|---|---|---|---|---|---|
| Finishing agent | Applied composition | 12 | 4 | 13 | 14 | 13 | 3 | 3 |
| Adhered oily components | Adhered amount wt % | 0.04 | 0.06 | 0.04 | 0.04 | 0.01 | 0.07 | 0.07 |
| | Adhered amount of ester component wt % | 0.062 | 0.038 | 0.038 | 0.048 | 0.005 | 0.048 | 0.048 |
| | Adhered amount of Component A wt % | 0.020 | 0.010 | 0.010 | 0.010 | 0.005 | 0.020 | 0.020 |
| | Adhered amount of Component B wt % | 0.000 | 0.002 | 0.002 | 0.002 | 0.002 | 0.002 | 0.002 |
| | Adhered amount of Component C wt % | 0.007 | 0.040 | 0.020 | 0.010 | 0.005 | 0.040 | 0.040 |
| Base fabric properties | Warp/weft crimp difference % | 2.5 | 2.5 | 2.5 | 2.5 | 0.5 | 3.0 | 4.0 |
| | Tensile strength N/cm | 620 | 590 | 590 | 610 | 490 | 550 | 590 |
| | Tensile strength after heating N/cm | 525 | 490 | 490 | 490 | 370 | 490 | 500 |
| | Composite yarn yarn-to-yarn friction index | 2.10 | 2.45 | 2.50 | 2.30 | 3.00 | 2.15 | 2.15 |
| | Composite yarn yarn-to-yarn friction index after heating | 3.60 | 3.40 | 4.00 | 4.30 | 4.50 | 3.10 | 3.10 |
| | Composite yarn loop strength cN/dtex | 9.3 | 10.2 | 9.4 | 8.9 | 7.5 | 11.0 | 11.0 |
| | Composite thread loop strength after heating cN/dtex | 5.0 | 3.8 | 3.5 | 2.4 | 2.0 | 6.3 | 6.3 |

TABLE 3-continued

| Sewn part strength | Sewing utilization rate % | 61 | 73 | 65 | 60 | 50 | 72 | 75 |
|---|---|---|---|---|---|---|---|---|
| | Strength retention rate after heating % | 78 | 68 | 68 | 68 | 50 | 75 | 75 |
| Deployment | Pyro proximate deployment after heating | B | C | C | C | C | E | B |

Example 19

A base fabric was obtained by weaving in the same manner as Example 1 with the exception of carrying out heat setting while setting overfeed in the warp direction corresponding to the lengthwise direction of the roll to 2.0% and setting widening in the weft direction corresponding to the widthwise direction of the roll to 2.0%. The results are shown in Table 2. This base fabric has a high sewing utilization rate and high strength retention rate for sewn parts after the passage of time in the presence of heat. However, the effect of the difference in crimps in the warp and weft directions was observed to a small degree, and broken weaving yarns were observed around the needle holes of sewn parts following deployment.

Example 20

A base fabric was obtained by weaving in the same manner as Example 2 with the exception of carrying out heat setting while setting overfeed in the warp direction corresponding to the lengthwise direction of the roll to 2.0% and setting widening in the weft direction corresponding to the widthwise direction of the roll to 2.0%. The results are shown in Table 2. This base fabric has a high sewing utilization rate and high strength retention rate for sewn parts after the passage of time in the presence of heat. However, the effect of the difference in crimps in the warp and weft directions was observed to a small degree, and broken weaving yarns were observed around the needle holes of sewn parts following deployment.

INDUSTRIAL APPLICABILITY

The base fabric for an airbag of the present invention is preferable for use as a woven base fabric for an airbag that composes a device for protecting occupants during a collision.

BRIEF DESCRIPTION OF THE REFERENCE SYMBOLS

1 Sample yarn
2 Weight (T1)
3 Load cell (T2)
4 Pulley

The invention claimed is:

1. A base fabric for an airbag composed of woven polyamide yarns, wherein the retention rate of the strength of sewn parts of the base fabric before and after heat treatment for 400 hours at 140° C. is 80% or more,
   wherein the difference in crimps of yarns between the warp direction and weft direction of composite yarns composing the base fabric before and after heat treatment for 400 hours at 140° C. is 5.0% or less,
   wherein at least one type of oily component selected from the group consisting of a higher alcohol ester and/or a higher alcohol polyether eater of a carboxylic acid having a thioether group, a nonionic surfactant component and a modified silicone component is imparted to polyamide yarns followed by weaving into a woven fabric,
   wherein a higher alcohol ester and/or a higher alcohol polyether ester of a carboxylic acid having a thioether group is contained in cyclohexane-extracted oily components at 0.01% by weight or more based on the weight of the base fabric, and
   wherein a ratio of weaving density in the warp direction to that in the weft direction (warp direction/weft direction) is 1.00 to 1.09.

2. The base fabric for an airbag according to claim 1, wherein the ratio of the sewn part strength to non-sewn part strength of the base fabric (sewn part strength/non-sewn part strength) is 60% or more.

3. The base fabric for an airbag according to claim 1 or 2, wherein the loop strength of composite yarns following heat treatment for 400 hours at 140° C. is 4.5 cN/dtex or more.

4. The base fabric for an airbag according to claim 1 or 2, wherein the yarn-to-yarn friction index of composite yarns following heat treatment for 400 hours at 140° C. is 1.5 to 3.5.

5. The base fabric for an airbag according to claim 1 or 2, wherein the loop strength of composite yarns composing the base fabric is 4.5 cN/dtex to 10.0 cN/dtex.

6. The base fabric for an airbag according to claim 1 or 2, wherein the yarn-to-yarn coefficient of friction of composite yarns is 1.5 to 3.5 and the loop strength thereof is 7 cN/dtex or more.

7. The base fabric for an airbag according to claim 1 or 2, wherein the tensile strength of the base fabric following heat treatment for 400 hours at 140° C. is 500 N/cm or more.

8. The base fabric for an airbag according to claim 1 or 2, wherein the tensile strength of the base fabric is 500 N/cm or more.

9. The base fabric for an airbag according to claim 1 or 2, wherein the strength of the raw yarn used for the weaving yarn is 8.0 cN/dtex or more.

10. The base fabric for an airbag according to claim 1 or 2, wherein an amount of cyclohexane-extracted oily components is greater than 0.02% by weight but less than 0.3% by weight based on the weight of the base fabric.

11. The base fabric for an airbag according to claim 1 or 2, wherein a higher alcohol ester of a carboxylic acid having a thioether group is contained in the cyclohexane-extracted oily components at 0.015% by weight or more based on the weight of the base fabric.

12. The base fabric for an airbag according to claim 1 or 2, wherein components for which the organic/inorganic ratio is 1.50 to 1.70 are contained in total in the cyclohexane-extracted oily components at 10% by weight or more of the total amount of oily components.

13. The base fabric for an airbag according to claim 1 or 2, wherein a nonionic surfactant component is contained in the cyclohexane-extracted oily components at 0.01% by weight or more based on the weight of the base fabric.

14. An airbag obtained by sewing the base fabric for an airbag according to claim 1 or 2.

15. An airbag module that includes the airbag according to claim 14.

* * * * *